United States Patent

DeLange et al.

[11] Patent Number: 5,977,741
[45] Date of Patent: Nov. 2, 1999

[54] METHOD FOR STABILIZING AC INDUCTION MOTOR HAVING AN OPEN LOOP INVERTER

[75] Inventors: Robert J. DeLange, St. Francis; David J. Cisler, Wauwatosa, both of Wis.

[73] Assignee: Allen-Bradley Company, LLC, Milwaukee, Wis.

[21] Appl. No.: 09/193,773

[22] Filed: Nov. 17, 1998

[51] Int. Cl.$^6$ .................................................. H02P 7/628
[52] U.S. Cl. .......................... 318/801; 318/807; 318/809; 318/811
[58] Field of Search ................................. 318/727, 767, 318/798–802, 807, 809, 810, 811

[56] References Cited

U.S. PATENT DOCUMENTS

| | | | |
|---|---|---|---|
| 4,310,791 | 1/1982 | Akamatsu | 318/800 |
| 4,388,578 | 6/1983 | Green et al. | 318/729 |
| 5,483,140 | 1/1996 | Hess et al. | 318/802 |
| 5,814,967 | 9/1998 | Garces et al. | 318/807 |
| 5,825,597 | 10/1998 | Young | 318/811 X |

*Primary Examiner*—Bentsu Ro
*Attorney, Agent, or Firm*—Michael A. Jaskolski; John M. Miller; John J. Horn

[57] ABSTRACT

A method and apparatus for minimizing motor instability under no load conditions, the method including identifying instability by comparing consecutive current half cycle periods and, where the difference between half cycle periods is sufficiently large, determining that instability exists and modifying controller modulating waveforms by reducing waveform magnitude until stability is achieved. Preferably the apparatus for achieving stability includes only a single current zero crossing sensor to minimize hardware costs.

12 Claims, 6 Drawing Sheets

METHOD FOR STABILIZING AC INDUCTION MOTOR HAVING AN OPEN LOOP INVERTER

BACKGROUND OF THE INVENTION

The present invention relates to variable frequency AC motors and more particularly, to a method and apparatus for stabilizing motor operation under no load conditions.

1. PWM Operation

One type of commonly designed induction motor is a three phase motor having three Y-connected stator windings. In this type of motor, each stator winding is connected to an AC voltage source by a separate supply line, the source providing time varying voltages across the stator windings. Often, an adjustable speed drive (ASD) will be positioned between the voltage source and the motor to control motor speed by controlling the stator voltages and frequency.

Figure 1:
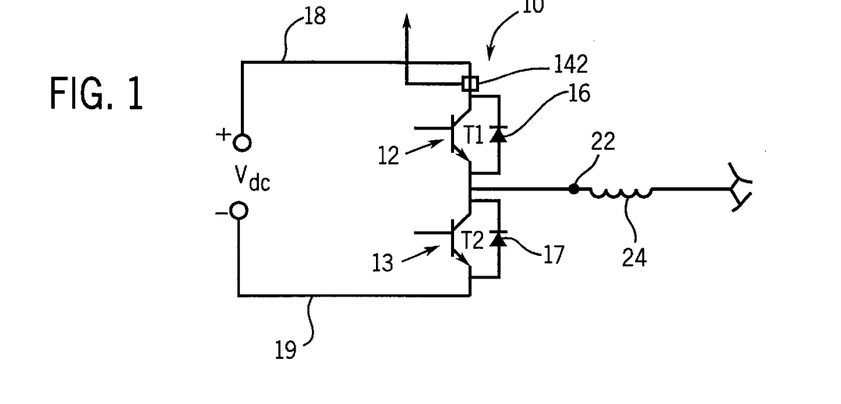
FIG. 1 is a schematic of a single leg of a three phase PWM inverter.

Many ASD configurations include a pulse width modulated (PWM) inverter consisting of a plurality of switching devices. Referring to FIG. 1, an exemplary PWM inverter leg 10 corresponding to one of three motor phases includes two series connected switches 12, 13 between positive and negative DC rails 18, 19 and two diodes 16, 17, a separate diode in inverse parallel relationship with each switch 12, 13. By turning the switches 12, 13 ON and OFF in a repetitive sequence, leg 10 receives DC voltage via rails 18 and 19 and provides high frequency voltage pulses to a motor terminal 22 connected to a stator winding 24. By firing the switching devices in a regulated sequence the PWM inverter can be used to control both the amplitude and frequency of voltage that are eventually provided across windings 24.

Figure 2:
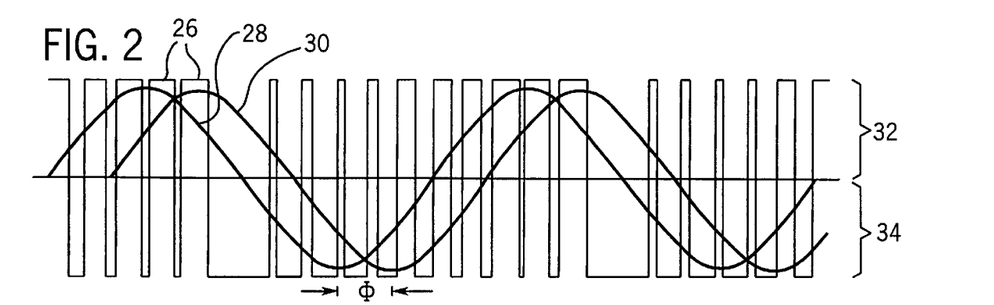
FIG. 2 is a graph illustrating a high frequency pulse train applied to a stator winding and a resulting low frequency alternating voltage and current.

Referring to FIG. 2, an exemplary sequence of high frequency voltage pulses 26 that an inverter might provide to a motor terminal can be observed along with an exemplary low frequency alternating fundamental voltage 28 and related alternating current 30. By varying the widths of the positive portions 32 of each high frequency pulse relative to the widths of the negative portions 34 over a series of high frequency voltage pulses 26, a changing average voltage which alternates sinusoidally can be generated. The changing average voltage defines the low frequency alternating voltage 28 that drives the motor. The low frequency alternating voltage 28 in turn produces a low frequency alternating current 30 that lags the voltage by a phase angle Φ.

Figure 3A:
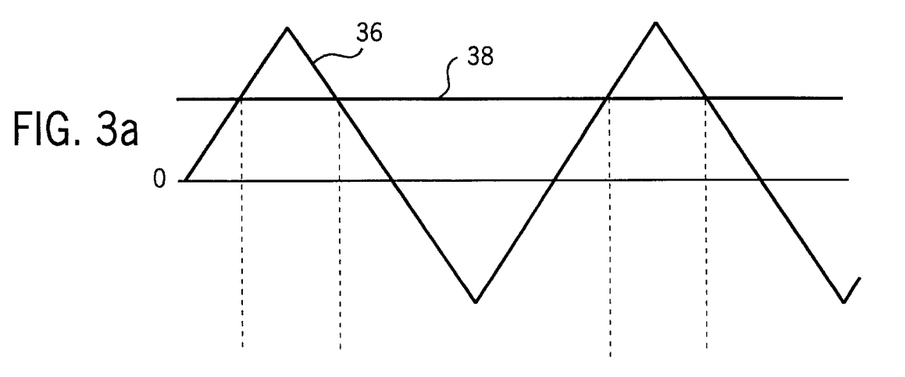
FIG. 3a is a graph illustrating the waveforms used by a PWM inverter to produce the high frequency pulses shown in FIG. 2, FIGS. 3b, 3c, 3e, and 3f are graphs illustrating PWM firing pulses.

The hardware which provides the firing pulses to the PWM inverter is typically referred to as a signal generator. Referring to FIG. 3(a), illustrative waveforms used by a signal generator to generate the firing pulses for leg 10 may be observed. As well known in the art, a carrier waveform 36 is perfectly periodic and operates at what is known as the carrier frequency. A command voltage waveform 38 is sinusoidal, having a much greater period than the carrier waveform 36.

Figure 3B:
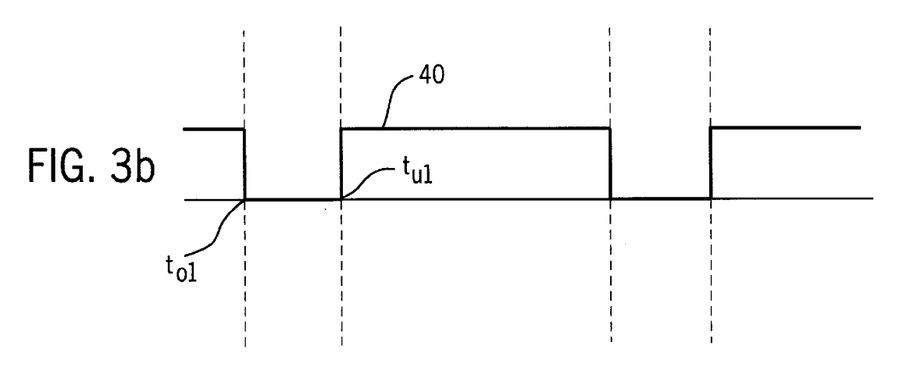
Figure 3C:
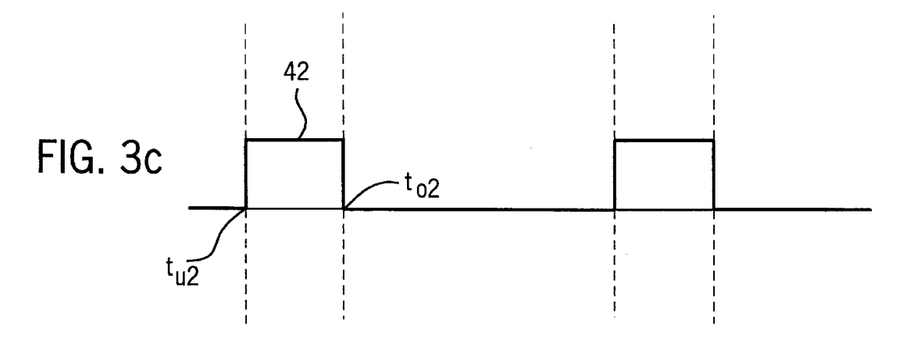

Referring also to FIGS. 3(b) and 3(c), an ideal upper signal 40 and an ideal lower signal 42 that control the upper and lower switches 12, 13 respectively can be observed. The turn-on $t_{u1}$, $tu_2$ and turn-off $t_{o1}$, $t_{o2}$ times of the upper and lower signals 40, 42 come from the intersections of the command waveform 38 and the carrier waveform 36.

When the command waveform 38 intersects the carrier waveform 36 while the carrier waveform has a positive slope, the upper signal 40 goes OFF and lower signal 42 goes ON. On the other hand, when the command waveform 38 intersects the carrier waveform 36 while the carrier waveform has a negative slope, the upper signal 40 goes ON and the lower signal 42 goes OFF. Thus, by comparing the carrier waveform 36 to the command waveform 38, the state of the upper and lower signals 40, 42 can be determined.

Figure 3D:
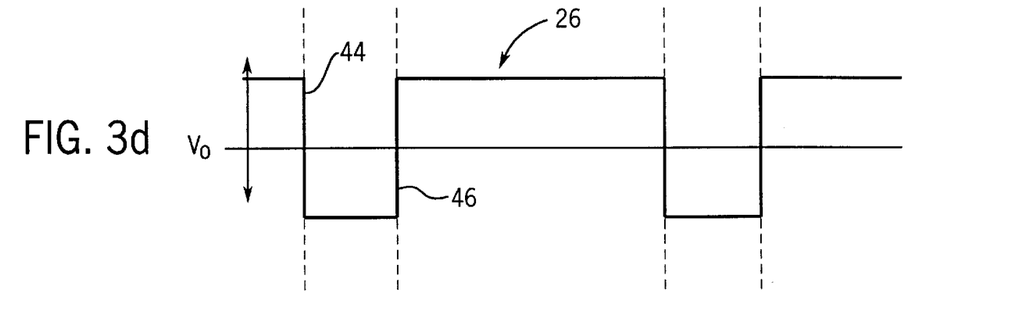
FIGS. 3d and 3g are graphs illustrating high frequency pulses delivered to a motor terminal.

Referring also to FIGS. 2 and 3(d), an ideal high frequency voltage pulse 26 resulting from the ideal upper and lower signals 40, 42 in FIGS. 3(b) and 3(c) that might be provided at terminal 22 can be observed. When the upper signal 40 is ON and the lower signal 42 is OFF, switch 12 allows current to flow from the high voltage rail 18 to motor terminal 22 thus producing the positive phase 44 of pulse 26 at motor terminal 22. Ideally, when the upper signal 40 goes OFF and the lower signal 42 goes ON, switch 12 immediately turns OFF and switch 13 immediately turns ON connecting motor terminal 22 and the low voltage rail 19 producing the negative phase 46 of pulse 26 at terminal 22. Thus, the ideal high frequency voltage pulse 26 is positive when the upper signal 40 is ON and is negative when the lower signal 42 is ON.

When phase currents define similar waveforms and consecutive positive and negative half cycles of the current waveforms have essentially identical durations, motor operation is said to be stable.

Unfortunately, while high frequency voltage pulse 26 is ideally positive when upper signal 40 is ON and is negative when the lower signal 42 is ON, in reality, inverter physics require control schemes which result in turn on delay or deadtime errors which adversely effects motor control. In addition, while stable motor operation is always a fundamental goal of motor control schemes, there are conditions under which operation becomes unstable thereby hampering motor control. Deadtime errors and a particular unstable set of motor operating conditions pertinent to the present invention are described below.

2. Deadtime Errors and Compensation

While advanced digital electronic signal generators can produce the desired high frequency signals to turn inverter components ON and OFF, the inverter components cannot turn ON and OFF instantaneously. Ideally, when one switch 12 turns on, the series switch 13 turns OFF, and visa versa.

In reality, however, each switch 12, 13 has turn-on and turn-off times that vary depending on the technology used for their construction. Thus, while signals to turn the upper switch 12 ON and the lower switch 13 OFF might be given at the same instant, the lower switch 13 may go OFF slower than the upper switch turns ON leading to a condition where both switches 12 and 13 are conducting thus providing an instantaneous DC short between high DC rail 18 and low DC rail 19. Such a DC short can cause irreparable damage to both the inverter and motor components.

Figure 3E:
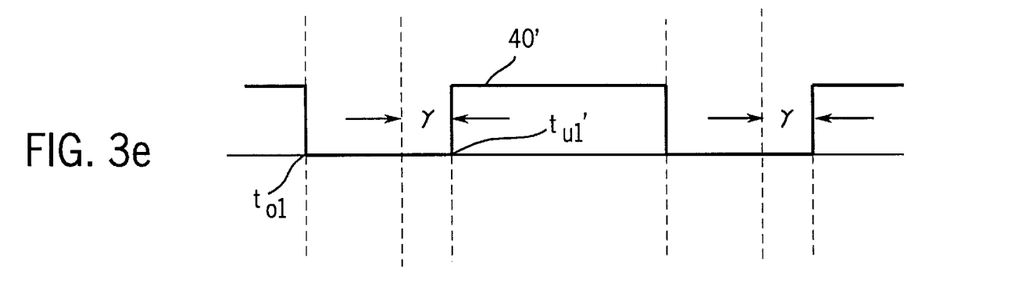
Figure 3F:
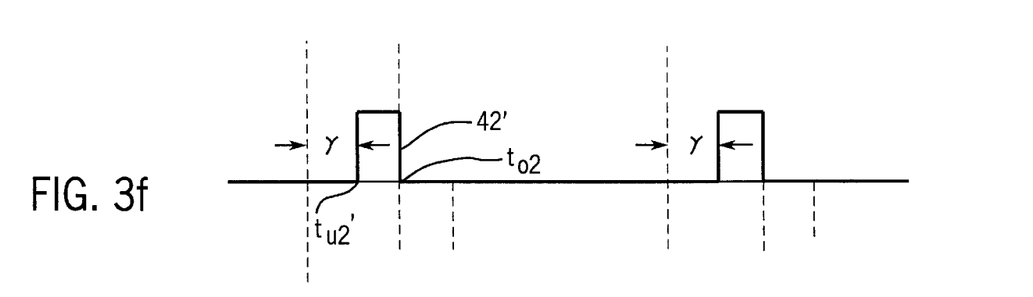

To ensure that the series switches of an inverter are never simultaneously on, a delay module is typically provided to introduce a turn-on delay between the times when one switch turns off and the other switch turns on. The delay module modifies the upper and lower signals 40, 42 by adding a turn-on delay period γ prior to the turn-on times $t_{u1}$, $t_2$ of each of the upper and lower signals 40, 42. Referring to FIGS. 3(e) and 3(f), the delay periods γ produce delayed and shortened upper and lower signals 40' and 42' having delayed turn-on times $t_{u1}'$, $t_{u2}'$.

Figure 3G:
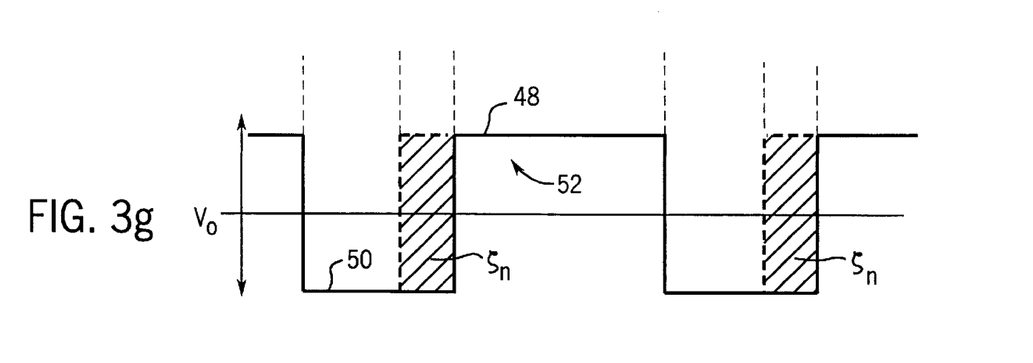

Referring to FIG. 3(g), while the delay periods γ protect the motor and inverter components, they produce voltage deviations $\zeta_n$ at the motor terminal 22 that produce distorted positive and negative phases 48, 50 and a distorted high frequency voltage pulse 52. These deviations $\zeta_n$ can best be understood by referring to FIGS. 1, 2, and 3(e)–3(g).

Referring to FIGS. 1, 2 and 3(e)–3(g), while the terminal current 30 at motor terminal 22 might be positive, the high frequency voltage pulses 26 will be oscillating from positive to negative phase as the delayed upper and lower signals 40', 42' turn the switches 12, 13 ON and OFF. Thus, while the terminal current 30 is positive, two signal states may occur. First, the upper signal 40 may be OFF while the lower signal 42 is ON and second the upper single 40 may be ON while the lower signal 42 is OFF. Likewise, when the current 69 is negative, the same two signal states may exist.

When the terminal current is positive and switch 12 is ON while switch 13 is OFF, the high voltage rail 18 is connected to motor terminal 22. Diode 17 blocks the flow of current to the low voltage rail 49. When the upper switch 12 turns OFF at $t_{o1}$, both series switches 12, 13 remain OFF during the delay period γ. As well known in the art, motor winding 24 operates as an inductor at terminal 22. Because of motor winding inductance, current 30 caused by voltage 28 cannot change directions immediately to become negative each time the high frequency voltage pulse 26 changes from the positive 32 to the negative 34 phase. The current remains positive and diode 17 immediately begins to conduct at $t_{o1}$ connecting the low voltage rail 19 to terminal 22 as desired. Hence, the terminal voltage goes negative at the desired time $t_{o1}$ even though the turn-on time $t_{u2}$ of the delayed lower signal 42' does not occur until after the delay period γ.

On the other hand, when switch 12 is initially OFF and switch 13 is ON and the terminal current 30 is positive, the low voltage rail 19 is connected through switch 13 to terminal 22 as desired and the resulting terminal voltage pulse 52 is in the negative phase 50. When switch 13 turns OFF at $t_{o2}$, as the positive terminal current 30 cannot immediately reverse itself, diode 17 conducts and low voltage rail 19 is again connected to terminal 22 for the duration of delay period γ. Thus, during the delay period γ, instead of having positive phase voltage at terminal 22 as desired, the negative phase 50 of the resulting terminal voltage pulse is extended until the turn-on time $t_{u1}'$ of delayed upper signal 72'.

Comparing FIGS. 3(d) and 3(g), the resulting terminal voltage pulses 52 have wider negative phases 50 and narrower positive phases 48 than the ideal voltage pulses 26. A voltage deviation $\zeta_n$ occurs each time the lower switch 13 is turned OFF and the terminal current 30 is positive. As well known in the art a similar type of deviation $\zeta_n$ of opposite polarity is produced when the terminal current 30 is negative and the upper switch 12 turns from ON to OFF.

Figure 4A:
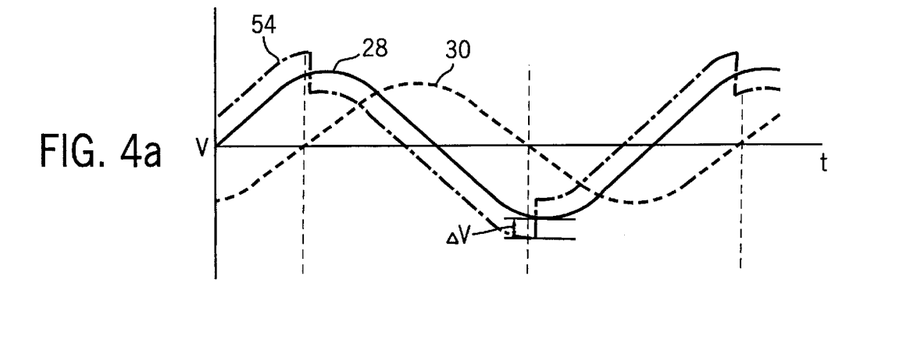
FIG. 4a is a graph illustrating ideal stator voltage and current and actual stator voltage prior to delay compensation and FIG. 4b is a graph illustrating a turn-on delay correction voltage.

While each individual deviation $\zeta_n$ does not appreciably affect the fundamental alternating voltage, accumulated deviations do distort the low fundamental frequency alternating voltage 28 and resulting current 30 thereby causing undesirable torque pulsations. Referring to FIG. 4a, an ideal terminal voltage 28 and associated current 30, and an actual terminal voltage 54 generated without compensating for turn on delay periods are illustrated. While the ideal voltage 28 and current 30 are purely sinusoidal, the actual voltage 54 is distorted by the $\zeta_n$ deviations. During positive terminal current 30 periods the actual voltage amplitude is reduced from the ideal amplitude by a value ΔV which can be expresses as:

$$\Delta V = \zeta_n * V_{dc} * f_{PWM} \qquad \text{Eq. 1}$$

where $V_{dc}$ is the DC voltage and $f_{PWM}$ is the carrier frequency of the PWM inverter. Similarly, during negative terminal current 30 periods the actual voltage amplitude is increased from the ideal amplitude by ΔV.

Figure 4B:
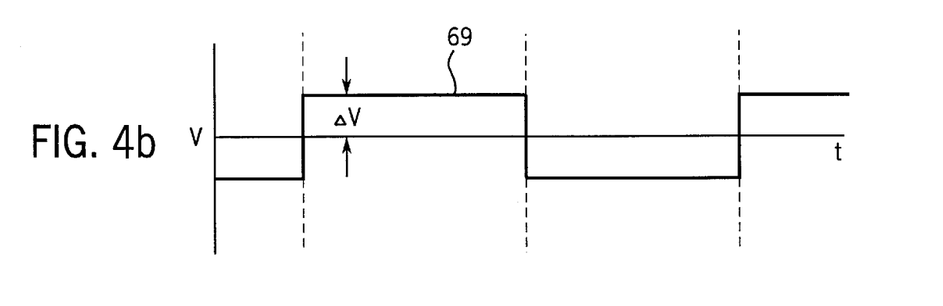

To compensate for terminal voltage deviations related to turn on delays the industry has tried various methods of adding and subtracting correction waveforms to the command signals used by the signal generator to derive firing signals for the PWM inverter. For example, referring also to FIG. 4b, because terminal voltage deviations are periodic, a periodic correction voltage 69 can be added to the command signal prior to comparison to the carrier signal. During positive current 30 periods, because turn on delays reduce the output voltage by ΔV, by adding a correction voltage 69 equal to voltage ΔV to the command signal, the deviation should be compensated. Similarly, during negative current 30 periods, because turn on delays increase the output voltage by ΔV, by subtracting a correction voltage 69 equal to voltage ΔV from the command signal, the deviation should be compensated. Thus, the correction signal 69 is positive and equal to ΔV when current 30 is positive and is negative and equal to ΔV when current 30 is negative. These types of correction schemes are commonly referred to as deadtime compensation.

One way to implement deadtime compensation is to determine current zero crossing instances for each of the three phase currents. Each time a current 30 crosses zero the correction voltage 69 is changed from positive to negative or vice versa, depending on the change in current 30 (i.e. when current 30 goes from negative to positive, correction voltage 69 goes positive and when current 30 goes from positive to negative, correction voltage 69 goes negative).

One way to identify current zero crossings in all three phase currents is to provide three separate zero crossing sensors, a separate sensor for identifying current zero crossings in each of the three motor phases. Another way to identify current zero crossings is to provide two current sensors and use the two signals generated thereby to generate a third current signal for the remaining phase, the three signals thereafter used to determine all zero crossings. Methods to determine zero crossings of all three phase currents from two current signals are well known in the controls art. Unfortunately, zero crossing sensors are relatively expensive and therefore three and two sensor designs are not preferred.

Another way to identify current zero crossings is to provide only a single zero crossing sensor and use the signal therefrom to estimate the zero crossings for all three phase currents. In theory, when motor operation is stable two assumptions can be made. First, when operation is stable, each of consecutive positive and negative current half cycles have nearly an identical duration (i.e. 180 electrical degrees). Second, during stable motor operation phase currents are precisely 120 degrees out of phase (i.e. phase currents in second and third phases lag the phase current in a first phase by precisely 120 and 240 degrees, respectively).

Thus, assuming stable motor operation, if one current zero crossing for a single phase current is identified, all other phase current zero crossings can be determined. For example, where motor phases are identified as A, B and C, arbitrarily choosing the current zero crossing from negative to positive half cycles in phase A as 0 degrees, it is assumed that the phase B current crosses zero from negative to positive at 120 degrees and the phase C current crosses zero from negative to positive at 240 degrees. In addition, under these circumstances it is also assumed that the phase A current crosses zero from positive to negative at 180 degrees and so on.

In reality, however, using a single zero crossing sensor and deriving all three phase current zero crossings from the signal generated thereby only allows zero crossings to be roughly determined. This is because motor operation is very rarely completely stable and phase shift between consecutive zero crossings varies about 120 degrees. While this crude method of determining zero crossings using a single sensor is insufficiently accurate for some applications, this method is sufficiently accurate for many other applications under conditions where motor operation is essentially stable.

Unfortunately, there are certain motor operating conditions which cause unstable motor operation and for which the two assumptions above concerning phase currents (i.e. 180 half cycles and 120 degree phase shift between phase currents) are invalid. One of set of conditions which is important for the purposes of the present invention is described below. Where 180 half cycles and 120 degree phase shift between phase currents cannot be assumed, a single zero crossing sensor cannot be used to implement deadtime compensation. In fact, if deadtime compensation were facilitated based on the two assumptions above during unstable motor operation, the compensation would further exacerbate instability. For this reason, despite the costs associated with additional hardware, the industry routinely configures control systems which include at least two current sensors to ensure that, even during unstable motor operation, deadtime compensation can be facilitated and will not exacerbate instability.

3. Instability Under No Load Conditions

The purpose of virtually all motor control schemes is to control a load linked to a controlled motor. For this reason, control effectiveness is typically measured by how a motor controls a load driven thereby. For example, with a load linked to a motor and a controller receiving a commanded reference velocity signal, control effectiveness may be measured by how closely the actual load velocity tracks the reference velocity both as the reference velocity signal varies and as the load varies.

Because control schemes are primarily designed to drive a load in a specific manner, motor control during no load conditions has been treated as relatively unimportant. Thus, after a load is delinked from a motor, approximate motor operation has been deemed acceptable by the industry because the motor is not performing any work (e.g. load driving) which can be used to measure control effectiveness (i.e. motor torque and speed are relatively unimportant under no load conditions).

While it may be true that approximate motor operation under no load conditions is acceptable for most applications, instability can become excessive where certain types of motor controllers are used. For example, where a controller having an open loop inverter is used to drive an unloaded motor, motor operation under certain conditions often becomes unstable. This is particularly true at operation below a base frequency (i.e. a rated operating frequency). When a motor is operated under no load and low frequency conditions specific stator and rotor slot alignment cause unbalanced magnetic pull which in turn has various effects which ultimately cause unstable motor operation. The cause and effect of unbalanced magnetic pull on AC motors is described in detail at pages 356–361 of a book by Phillip L. Alger entitled "Induction Machines" which was published in 1970 and which is incorporated here by reference.

Figure 5:
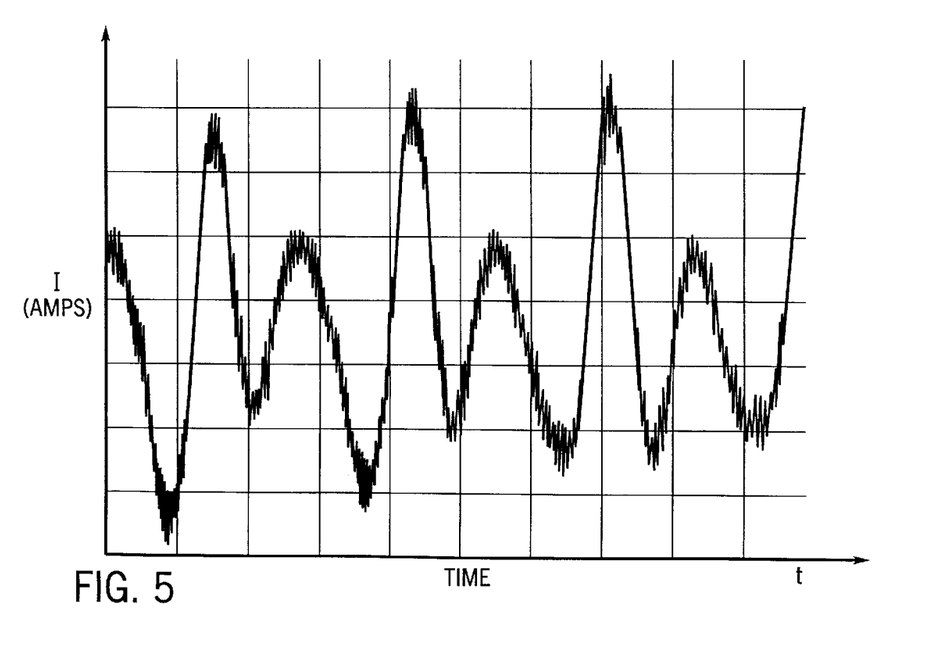
FIG. 5 is a waveform illustrating unstable motor current during no-load operation of a motor.

For the purposes of this explanation, one effect of unbalanced magnetic pull is to severely distort phase current waveforms, one of which is illustrated in FIG. 5. Although difficult to ascertain from FIG. 5, when a phase current is distorted, consecutive phase current positive and negative half cycle durations are different. For example, under no load conditions a positive phase A current half cycle having a 175 degree duration may be consecutively followed by a negative phase A current half cycle having a 185 degree duration. Disparate half cycle durations cause instability. This instability may cause effects which range from simple motor component wear (e.g. premature ball bearing wear) to actual motor shaking and movement.

Thus, it would be advantageous to have a controller and a method which could eliminate or substantially minimize operating instability under no load conditions. In addition, it would be advantageous to have a method whereby a single current zero crossing sensor could be used to stabilize motor operation under no load conditions and wherein a single current sensor could be used to facilitate deadtime compensation.

BRIEF SUMMARY OF THE INVENTION

The present invention includes a method for stabilizing motor operation under no load conditions. It has been recognized that during motor operation under no load, control considerations and the factors which determine those consideration are very different than during normal loaded and stable operation.

First, under no load conditions instability is a primary concern and, as indicated above, precise motor control is only a secondary concern. Therefore, under no load condition, where stability can be achieved at the expense of precise control, a motor should be controlled to cause stability.

Second, in many cases, under no load conditions, deadtime compensation, rather than causing stability, can be a source of instability. For example, where a positive half phase current is followed by a relatively shorter negative half phase current, typical deadtime compensation increases a corresponding positive half-phase modulating waveform to a greater degree than the following negative half phase modulating waveform. The phase current which results from the waveform modification is further unbalanced. It has been recognized that by reducing the deadtime compensation magnitude or, in extremely unbalanced cases, even providing an inverted fraction of a typical deadtime compensation signal, stability under no load operation can be achieved.

Thus, it is a primary goal of the present invention to achieve motor stability under no load conditions and at all operating frequencies. To this end, current zero crossings in a single motor phase are detected and consecutive half phase cycle durations are determined and compared. Where consecutive durations are essentially identical (e.g. within an acceptable instability band or first range), normal deadtime compensation is facilitated to facilitate precise motor control. Thus, during loaded operation when motor operation is essentially stable, normal deadtime compensation occurs.

However, where consecutive durations are substantially different (i.e. the difference is greater than an acceptable instability), the inventive method reduces the deadtime compensation magnitudes and in some cases where the difference is large, provides an inverted fraction of the deadtime compensation signals, the sign and magnitude of the resulting deadtime correction signal depending on the degree of difference between the consecutive current half cycle durations. It should be noted that while the modified signal is referred to as a deadtime correction signal, the correction signal in fact is not a deadtime compensation signal but is referred to by the term "deadtime" because the correction is implemented by modifying the deadtime compensation signals.

Although the inventors do not intend to be held to a single theory, it is believed that when deadtime correction signals are added to modulating waveforms, associated fundamental frequency phase voltages caused by the modified modulating waveforms more closely resemble square step type voltages having reduced magnitudes. It is believed that these fundamental voltages reduce the effects of unbalanced magnetic pull and therefore cause consecutive current half cycle durations to conform.

In addition, it has been recognized that only a single current zero crossing detector is required to implement the present inventive method. As indicated above, when motor operation is stable, phase currents are essentially periodic and interphase currents are separated by essentially 120°. Thus, during stable operation zero crossings can be determined for deadtime compensation purposes by using a single zero crossing sensor to determine zero crossings of a first phase current and deriving the second and third phase zero crossing therefrom.

During unstable no load operation, the first zero crossing detector is again used to detect zero crossing on the first phase. However, instead of precisely determining zero crossings on the second and third phases the zero crossing on the second and third phases are assumed to follow the detected first phase zero crossing by 120° and 240°, respectively. Then, based on the difference between consecutive first and second half-cycle durations of the first phase current, deadtime compensation during a third half-cycle of the first phase which consecutively follows the second half-cycle is modified in all three phases generating a separate deadtime correction signal for each motor phase. The correction signals are then added to the modulating waveforms during the third half-cycle of the first current. At the end of the third half-cycle, the third half-cycle duration is compared to the preceding second half-cycle duration and the process above is repeated to modify deadtime compensation signals during a fourth half-cycle of the first current. While deadtime correction in the second and third phases may not be precisely aligned with current zero crossings in those phases, it has been found that the estimate is sufficiently close to cause stable motor operation.

Thus, another object of the invention is to provide a method whereby a single zero crossing detector can be used to facilitate both deadtime compensation and operating stability, even under no load conditions. This object is achieved in the manner indicated above.

These and other objects, advantages and aspects of the invention will become apparent from the following description. In the description, reference is made to the accompanying drawings which form a part hereof, and in which there is shown a preferred embodiment of the invention. Such embodiment does not necessarily represent the full scope of the invention and reference is made therefor, to the claims herein for interpreting the scope of the invention.

DETAILED DESCRIPTION OF THE INVENTION

Referring now to the drawings, wherein like reference characters represent corresponding elements throughout the several views, and more specifically referring to FIG. 6, the present invention will be described in the context of an exemplary motor control system 100. System 100 includes a number of components which together cooperate to generate current on three supply lines 102, 104 and 106 which are linked to a motor 108, each supply line 102, 104 or 106 providing current to a separate one of three phases of motor 108. System 100 includes a modulating waveform generator 110, a no load stabilizer 112, a deadtime compensator 114, three summers 116, 118 and 120, a carrier generator 122, a comparator 124, a delay module 126 and an inverter 128.

Generally speaking, stabilizer 112, compensator 114, generator 110 and summers 116, 118, and 120 cooperate to generate three modulating waveforms which are provided to comparator 124. In addition, generator 122 provides a high frequency triangle wave carrier signal to comparator 124. Carrier 124 compare each of the modulating waveform signals to the carrier signal to generate three firing pulse signals on lines 130, 132 and 134, a separate firing signal corresponding to each of the modulating waveforms. Referring also to FIG. 3a an exemplary modulating signal 38 and carrier signal 36 are illustrated. When modulating signal 38 is less than carrier signal 36, a corresponding firing signal is low. Similarly, when modulating signal 38 is greater than carrier signal 36, corresponding firing signal is high.

The firing signals are provided to delay module 126 which first generates upper and lower signals (e.g. see FIGS. 3(b) and 3(c)) and delays each upper and each lower signal (e.g. see FIGS. 3(e) and 3(f)). The delayed signals are provided to inverter 128 via lines 136, 137, 138, 139, 140 and 141. The delayed upper and lower signals control inverter 128 as described above with respect to FIG. 1 to generate currents through, and voltages across, lines 102, 104 and 106.

Referring again to FIG. 1, a single inverter leg 10 is illustrated which includes two series linked switches 12 and 13 which traverse the distance between a positive DC bus 18 and a negative DC bus 19. Two diodes 16 and 17 are arranged in inverse parallel relationship with respect to switches 12 and 13, respectively. A node 22 between switches 12 and 13 is linked to a single motor winding 24.

Figure 6:
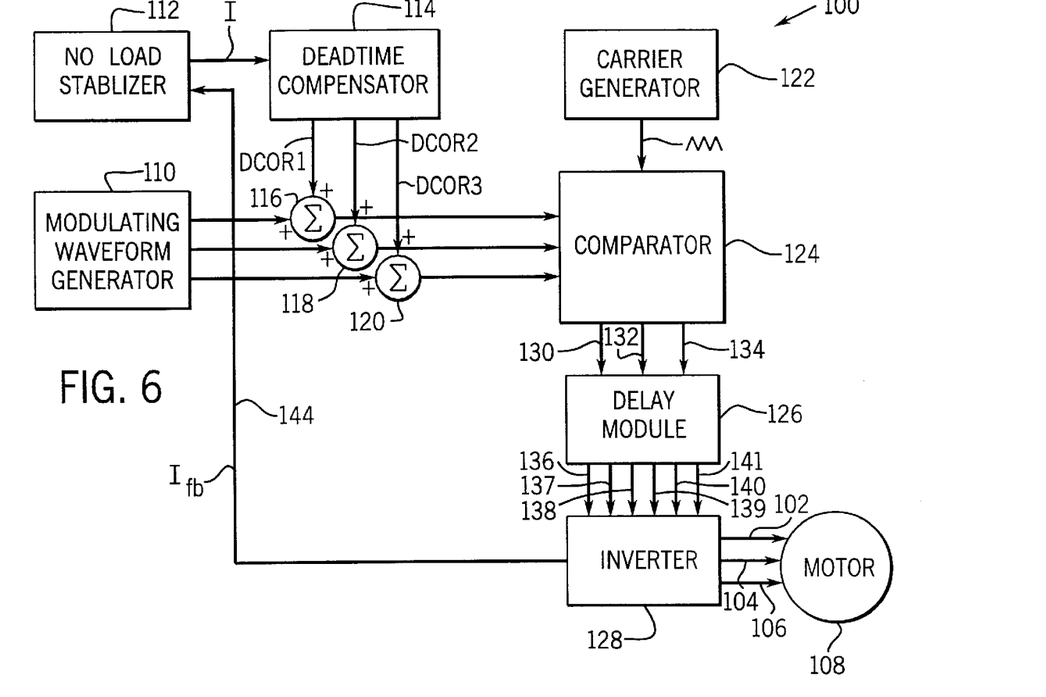
FIG. 6 is a block diagram illustrating various components of a motor control system.

A single simple current sensor 142 is linked between positive DC rail 18 and switch 12 and provides a current signal $I_{fb}$ via line 144 to stabilizer 112 (see FIG. 6). Sensor 142 is simple in that, instead of providing a precise current signal, sensor 142 need only identify when any current is passing through switch 12 or diode 16.

In operation, during a turn-on delay when both switches 12 and 13 are off, when current passing through winding 24 is positive (i.e. is passing from inverter leg 10 through winding 24), the positive current is drawn from negative DC bus 19 through diode 17 and then through winding 24. On the other hand, during a turn-on delay period when switches 12 and 13 are off and current is negative (i.e. current is traveling from winding 24 to inverter leg 10), current passes from winding 24 through diode 16 to positive DC bus 18. Therefore, during turn-on delay periods when current through winding 24 is positive, zero current should be detected by sensor 142. However, when the current through winding 24 is negative during a turn-on delay period current should be detected by sensor 142. Thus, to determine when a current zero crossing occurs (i.e. when the current through winding 24 either changes from positive to negative or from negative to positive), the signal generated by sensor 142 during turn-on delay periods can be monitored for any change. When the current through winding 24 changes from negative to positive, the signal generated by sensor 142 will change from a non-zero current to zero current. Similarly, when the current through winding 24 changes from positive to negative, the signal generated by sensor 142 will change from zero to a non-zero value.

Referring again to FIG. 6, modulating waveform generator 110 generates three sinusoidal modulating waveforms which are essentially 120° out of phase. Apparatuses and methods by which modulating waveforms are generated are well known in the art and therefore will not be described here in detail. Each of the three modulating waveforms is provided to a separate one of the three summers 116, 118, and 120.

Figure 7:
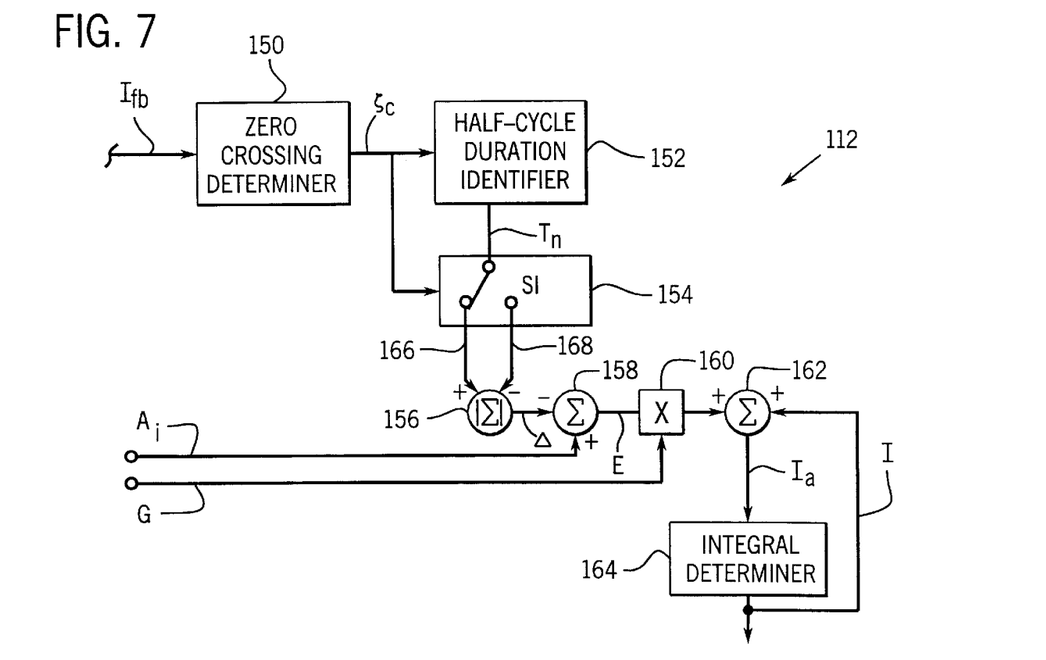
FIG. 7 is a block diagram of the inventive stabilizer of FIG. 6.

Referring also to FIG. 7, according to a preferred embodiment of the invention stabilizer 112 includes a zero crossing detector 150, a half cycle duration identifier 152, a switch 154, a summer 156, another summer 158, a multiplier 160, another summer 162 and an integral determiner 164. In addition to receiving the feedback current signal $I_{fb}$ via line 144, stabilizer 112 is also provided with an acceptable instability signal $A_i$ and a gain signal G. The acceptable instability signal $A_i$ indicates an amount of instability which is known to cause little if any damage to motor components and causes very little motor shaking or motion. For example, where the difference between consecutive current half-cycle durations corresponds to a minimal phase angle (e.g. 2°), stability may be deemed acceptable. In this case, signal $A_i$ would correspond to a time indicative of a 2° difference in half-cycle durations. Gain G is simply provided as an adjustment which can be modified by a system user to effect how quickly instability is eliminated or substantially reduced. Both $A_i$ and gain G may be set for a motor by a manufacturer or, a controller may be configured to enable a system operator to select value $A_i$ and/or gain G.

Referring still to FIG. 7, determiner 150 receives feedback current $I_{fb}$ from sensor 142 and, each time a first current signal $I_{fb}$ is zero and a consecutive current signal $I_{fb}$ has a non-zero value or the first current signal $I_{fb}$ has a non-zero and a consecutive current signal $I_{fb}$ is zero, determiner 150 generates a zero crossing pulse $\zeta_c$ which is provided to identifier 152 and switch 154. Identifier 152 includes a clock and simply generates a half-cycle duration signal $T_n$ indicating the duration of a most recent phase current half-cycle, signal $T_n$ provided to switch 154.

To this end, identifier 152 stores a first zero crossing time and monitors the output of determiner 150 to identify a second consecutive zero crossing time. When the second zero crossing time is sensed, identify 152 performs two functions. First, identify 152 determines duration $T_n$ by subtracting the first from the second time. Second, identifier 152 stores the second time as the first and monitors pulse $\zeta_c$ for the next consecutive zero crossing time.

Switch 154 is a single pole double throw switch which has a single input linked to identifier 152 to receive signal $T_n$ and has two outputs 166 and 168. Each time a zero crossing pulse $\zeta_c$ is provided to switch 154, switch 154 changes state. For example, if switch 154 is currently linked to output 166, when a next zero crossing pulse $\zeta_c$ is received, switch 154 switches so that signal $T_n$ is provided to output 168. Thus, switch 154 provides consecutive phase current duration signals alternately to output lines 166 and 168.

Summer 156 receives the signals on lines 166 and 168 and subtracts the signal on line 168 from the signal on line 166. In addition, summer 156 only provides the magnitude of the difference between consecutive half-cycle durations to summer 158. Thus, each time a new zero crossing is identified by determiner 150, identifier 152 determines the duration of the most recent half-cycle (i.e. the half-cycle ending with the most recent zero crossing pulse $\zeta_c$) and provides that duration $T_n$ to switch 154. Summer 156 determines the magnitude $\Delta$ of the difference between the most recent two consecutive current half-cycles and provides that difference magnitude signal $\Delta$ to summer 158.

Referring still to FIG. 7, summer 158 subtracts magnitude $\Delta$ from acceptable instability value $A_i$ and provides an error signal E to multiplier 160. Multiplier 160 multiplies error signal E by gain G and provides its output to summer 162. Summer 162 adds the signal from multiplier 160 to an integral signal I and provides its output as an integral adjust signal $I_a$ to integral determiner 164. Integral determiner 164 applies a series of rules to the integral adjust signal $I_a$ to determine a proper integral signal I and provides the integral signal I as its output to deadtime compensator 114 (see FIG. 6) and to summer 162.

Referring again to FIG. 6, deadtime compensator 114 receives integral signal I and adds integral signal I to a deadtime compensation signal magnitude $DC_m$ to generate a deadtime correction magnitude $D_m$. It is assumed that the deadtime compensation signal magnitude $DC_m$ has already been derived using Equation 1 above or some permutation thereof and that compensator 114 is provided with signal $DC_m$. Next compensator 114 generates three deadtime correction signals DCOR1, DCOR2 and DCOR3, a separate correction signal corresponding to each modulating waveform. To this end, compensator 114 is programmed to assume 120° phase shift between phase currents so that approximate zero crossing instances for all three phase currents can be determined. The correction signals DCOR1, DCOR2 and DCOR3 are generated by facilitating normal deadtime correction using correction magnitude $D_m$. Then, during the duration of the third half-cycle of the detected current (i.e. prior to the next pulse $\zeta_c$), compensator 114 provides correction signals DCOR1, DCOR2 and DCOR3 to summers 116, 118 and 120, respectively.

Integral signal I is always negative and therefore, when integral signal I is added to the deadtime compensation magnitude, the deadtime correction magnitude is at least reduced and, in extremely unstable situations, will be equal to negative the deadtime compensation magnitude $DC_m$.

Figure 8:
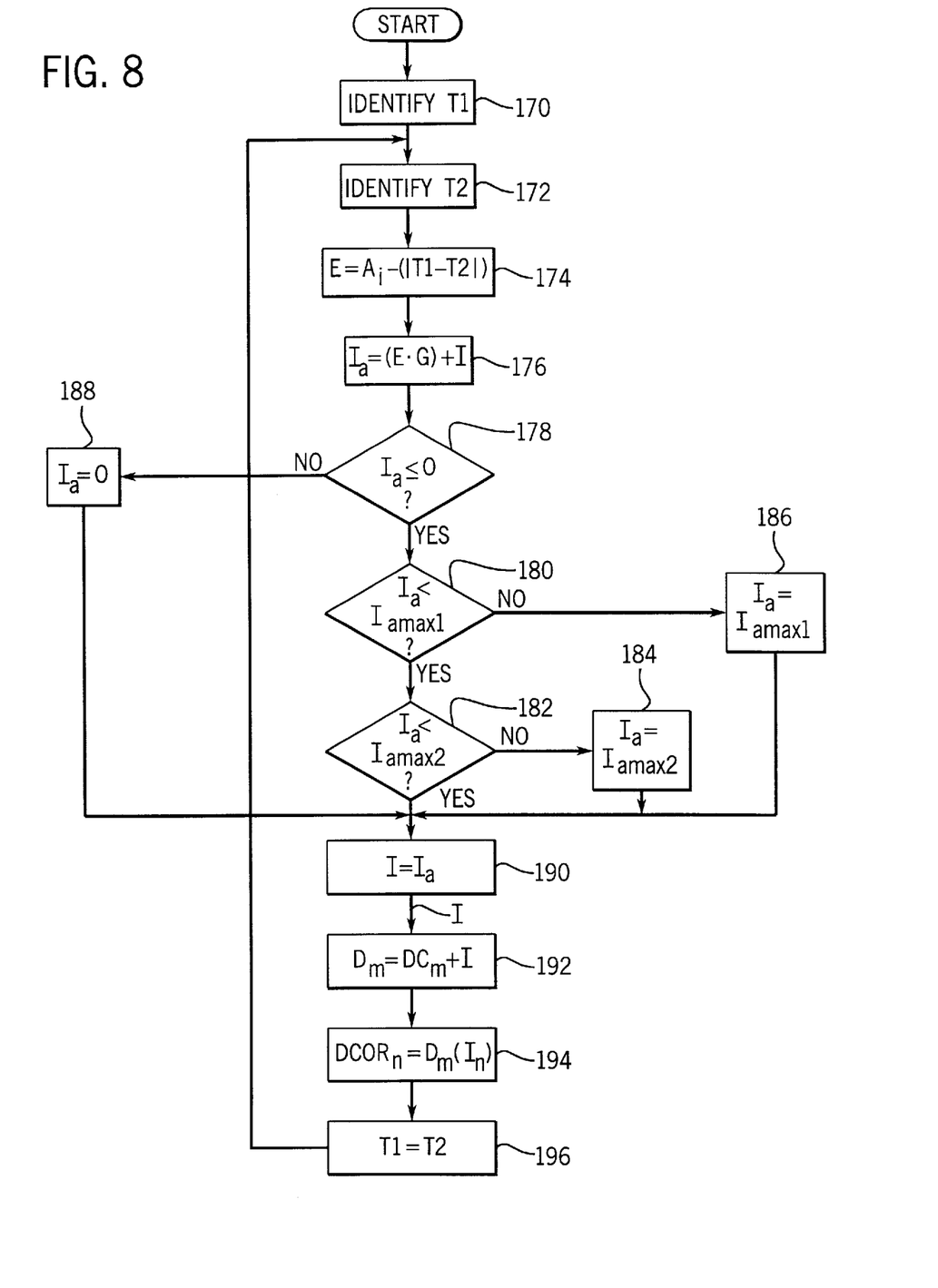
FIG. 8 is a flow chart illustrating a preferred inventive method.

Referring now to FIG. 8, a preferred inventive method will be described. Referring also to FIGS. 6 and 7, at process block 170 zero crossing determiner 150 and identifier 152 cooperate to identify a first half-cycle duration T1. Switch 154 provides duration T1 on line 166. At block 172, determiner 150 generates the next zero crossing pulse $\zeta_c$ causing switch 154 to change state connecting its input to output 168. In addition, zero crossing pulse $\zeta_c$ is provided to identifier 152 which identifies the duration of a second current half-cycle T2. Duration T2 is provided on output line 168 to summer 156.

At process block 174 summer 156 determines the magnitude of the difference between durations T1 and T2 and provides the magnitude difference $\Delta$ to summer 158. In addition, at block 174, summer 158 subtracts difference magnitude $\Delta$ from acceptable instability signal $A_i$ providing error signal E. At block 176 multiplier 160 multiplies error E by gain G. In addition, at block 176 summer 162 adds integral I to the sum (E*G) providing integral adjust signal $I_a$.

The portion of the method in FIG. 8 identified by numerals 178, 180, 182, 184, 186, 188 and 190 is performed by integral determiner 164. At decision block 178, determiner 164 determines if integral adjust $I_a$ is less than or equal to zero. Where integral adjust $I_a$ is greater than zero control passes to block 188 and integral adjust $I_a$ is set equal to zero. Thereafter control passes to block 190. However, if integral adjust $I_a$ is less than or equal to zero, control passes to block 180.

At block 180 determiner 164 determines whether or not integral adjust $I_a$ is less than a first speed dependent maximum integral adjust value $I_{amax1}$. The first speed dependent integral adjust maximum value $I_{amax1}$ corresponds to a maximum integral adjust value given a specific motor speed. For example, at a first motor speed value $I_{amax1}$ may be equal to negative twice the deadtime compensation signal magnitude $DC_m$ (i.e. may be $2DC_m$). At a second speed a second speed dependent integral adjust maximum $I_{amax2}$ may be negative the deadtime compensation signal magnitude $DC_m$. These values will be assumed for the remainder of this description.

Where integral adjust $I_a$ is greater than the first maximum $I_{amax1}$, control passes to block 186 where integral adjust $I_a$ is set equal to first maximum signal $I_{amax1}$. If integral adjust $I_a$ is less than first maximum signal $I_{max1}$ control passes to block 182.

At block 182 determiner 164 determines whether or not integral adjust $I_a$ is less than the second maximum value $I_{amax2}$. Where integral adjust $I_a$ is less than the second maximum value $I_{amax2}$ control passes to block 190. In the alternative control passes to block 184 where integral adjust $I_a$ is limited and set equal to the second maximum value $I_{amax2}$. Thereafter control passes to block 190. At block 190, integral I is set equal to the integral adjust $I_a$.

Referring to FIGS. 6 and 8, integral value I is provided to compensator 114. At block 192 compensator 114 adds integral value I to the deadtime compensation magnitude DC thereby generating correction magnitude $D_m$. At block 194, for each phase current $I_n$, zero crossings are estimated and the sign $I_{ns}$ of each current (i.e. positive or negative) is determined. Then, a separate deadtime correction signal $DCOR_n$ is generated for each motor phase by solving the following equation:

$$DOR_n = D_m(I_{ns}) \qquad \text{Eq. 2}$$

where n corresponds to a specific phase (e.g. 1, 2 or 3). The deadtime correction signals DCOR1, DCOR2 and DCOR3 are provided to summers 116, 118 and 120. Summers 116, 118 and 120 add modulating waveforms and corresponding deadtime correction signals received to generate modified modulating waveforms which are provided to comparator 124. At block 196 identifier 152 sets duration T1 equal to T2 and control passes back to block 172 where identifier 152 monitors for the next zero crossing pulse $\zeta_c$ for determining a new second duration T2.

Referring still to FIG. 8, initially assuming a zero integral value I, where magnitude difference $\Delta$ between durations is less than acceptable instability value $A_i$ (e.g. 2°), error E is positive at block 174, adjust $I_a$ is positive at block 176, $I_a$ is set equal to zero at block 188, integral I is set equal to zero at block 190 and correction magnitude $D_m$ is set equal to compensation magnitude $DC_m$ at block 192. In this case, correction signals DCOR1, DCOR2 and DCOR3 are equal to the original deadtime compensation signals and typical deadtime compensation occurs.

However, assuming an initial negative integral value I, even if magnitude difference $\Delta$ is less than instability value $A_i$ so that error E is positive (block 174), if the value (E*G) is less than integral value I, integral adjust $I_a$ is negative at block 176 and a reduced correction magnitude $D_m$ causes modified signals DCOR1, DCOR2 and DCOR3.

Referring still to FIG. 8, despite the value of integral I, where magnitude difference $\Delta$ (i.e. |T1–T2|) is greater than acceptable instability value $A_i$ so that unstable motor operation is identified, error E is negative at block 174, integral adjust $I_a$ is negative at block 176, integral value I is negative at block 190. Correction magnitude $D_m$ is reduced at block 192 and each correction signal $DCOR_n$ is modified accordingly.

Figure 9:
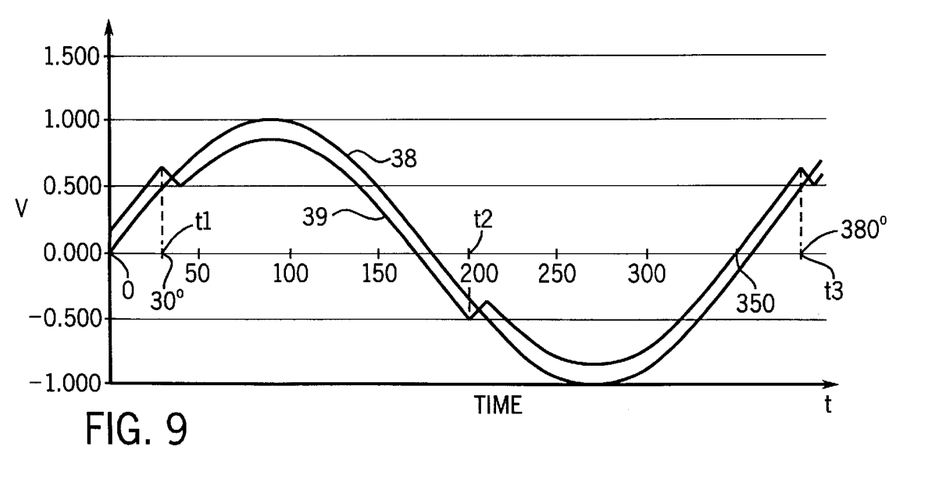
FIG. 9 is a graph illustrating an initial modulating waveform and a modulating waveform modified in accordance with the present invention.

Referring now to FIG. 9, an initial modulating waveform 38 and a modulating waveform 39 as modified according to the present invention are illustrated. Initial waveform 38 is sinusoidal having half-cycle durations which correspond precisely to 180°. A phase current generated thereby (not illustrated) crosses the zero amplitude at times t1, t2, and t3 consecutively. It will be assumed for the purposes of this explanation that time t1 corresponds to a 30° phase angle, t2 corresponds to a 20° phase angle and t3 corresponds to a 380° phase angle. Thus, a first half-cycle of the phase current between times t1 and t2 corresponds to a 170° duration (i.e. 200°–30°=170°) whereas the second half-cycle between times t2 and t3 corresponds to a 180° duration (i.e. 380°–200°=180°). Thus, the difference between durations of the first and second current half-cycles corresponds to 10°.

Referring also and again to FIG. 8, it will be assumed that an initial integral value I is zero, an acceptable instability value $A_i$ is 2°, gain G is 1.0 unit/degree and deadtime compensation magnitude $DC_m$ is 4 units. Given these assumptions, at step 174 error signal E equals –8°. At step 176, the integral adjust $I_a$ in this example is –8° times gain G. Because gain G is equal to 1 unit/degree, block 176 yields an integral adjust value $I_a$ which is equal to –8 units.

At block 178 integral adjust $I_a$ is less than zero and therefore control passes to block 180. As indicated above, in the present example it is assumed that first maximum value $I_{amax1}$ is equal to negative twice the deadtime compensation signal magnitude $DC_m$. Because the first maximum integral adjust value $I_{amax1}$ is –8, at block 180 control passes to block 186 where integral adjust $I_a$ is set equal to the first maximum value $I_{amax1}$ which is –8. At block 190 integral I is set equal to integral adjust $I_a$ and therefore is set equal to –8 units. At block 192 the integral (i.e. –8 units) is added to the deadtime compensation magnitude $DC_m$ (i.e. 4) generating deadtime correction magnitude $D_m$. At block 194 signals DCOR1, DCOR2 and DCOR3 are generated by solving Equation 2. Signals DCOR1, DCOR2 and DCOR3 are added to respective waveforms.

Referring again to FIG. 9, at this point it will be assumed that all of the computation above occurred before time $t_1$ and therefore, that the period between times $t_1$ and $t_2$ is a third period during which signals DCOR1, DCOR2 and DCOR3 are used to modify corresponding modulating waveforms.

In the present example, because magnitude $D_m$ is −4, during each positive half phase current each of signals DCOR1, DCOR2 and DCOR3 has a −4 value and during each negative half phase current each signal DCOR1, DCOR2 and DCOR3 has a +4 value. In effect, when each correction signal is added to a corresponding modulating waveform, each waveform is reduced as illustrated in FIG. 9 (see 39). Correction signals DCOR1, DCOR2 and DCOR3 are updated every half-cycle of the monitored phase current and therefore, once stability has been achieved through either adjusting signals DCOR1, DCOR2 and DCOR3 or through loading the motor, stability is maintained.

It should be understood that the methods and apparatuses described above are only exemplary and do not limit the scope of the invention, and that various modifications could be made by those skilled in the art that would fall under the scope of the invention. For example, while a preferred method for stabilizing a motor under no load is indicated above, other methods are contemplated. For example, it has been recognized that the overall effect of reducing or inverting deadtime compensation is to reduce the fundamental component of a resulting phase voltage and associated current. Thus, although such a system has not been tested, the present inventors believe that a simple system which reduces the magnitude of modulating waveforms when no load instability is detected would achieve similar stabilizing effect, again, at the expense of some control precision. In this case, feedback current $I_{fb}$ would again be used to determine when instability occurs and, when instability is identified, the magnitude of a modulating waveform would simply be reduced (within an acceptable range) until instability subsides.

In addition, while the invention is described as requiring only a single zero crossing sensor, other configurations are contemplated wherein two or three current sensors could be used. While such a configuration would be relatively more expensive, such a configuration would provide more precise compensation for both stability and deadtime correction purposes. Moreover, the current sensor(s) could be placed in any of several different locations to detect phase current zero crossings.

Moreover, while the maximum integral adjust $I_{amax1}$ is described above as being negative twice the deadtime compensation signal magnitude clearly other greater or lesser maximum adjusts could be selected, the maximum adjusts being subject to designer choice.

Furthermore, while the invention is described above as including an integral function (see FIG. 8, blocks 174 and 176) to determine the integral adjust $I_a$ as a function of zero crossing period error (i.e. T1–T2), clearly other types of gain (e.g. PID, proportional, etc.) based on the period error could be used.

To apprise the public of the scope of this invention, we make the following claims:

We claim:

1. A method for use with a three phase AC induction motor and a motor controller including an open loop inverter and at least one sensor which identifies zero crossings in a single motor phase current, the controller providing a first range and a separate modulation signal for each of the three motor phases, the method for stabilizing motor operation during no load conditions, the method comprising the steps of:

a) identifying the duration of a first half cycle of the phase current as a first duration;

b) identifying the duration of a second half cycle of the phase current which consecutively follows the first half cycle as a second duration;

c) mathematically combining the first and second durations to generate a cycle error having a difference magnitude;

d) determining if the difference magnitude is within the first range;

e) where the difference magnitude is within the first range, reducing the modulating waveforms during a third half cycle which consecutively follows the second half cycle; and f) repeating steps (a) through (e) with the second half cycle as the first half cycle, the third half cycle as the second half cycle, and a fourth half cycle as the third half cycle, the fourth half cycle consecutively following the third half cycle.

2. The method of claim 1 wherein the step of mathematically combining includes the step of subtracting.

3. The method of claim 2 wherein the controller also provides three initial deadtime compensation signals, one deadtime compensation signal corresponding to each of the three modulating signals, the step of reducing includes the step of modifying the magnitudes of the deadtime compensation signals as a function of the difference magnitude thereby generating three deadtime correction signals and adding the deadtime correction signals to associated modulating signals.

4. The method of claim 3 wherein the step of modifying includes reducing the deadtime compensation signal magnitude to generate the deadtime correction signals.

5. The method of claim 4 wherein the controller initially provides an integral and, after the first time through steps (a) through (f) the method generates the integral, the integral corresponding to the amount by which the deadtime compensation signal magnitude has most recently been modified and, wherein the controller also provides an acceptable instability value indicating a magnitude which corresponds to an acceptable degree of instability and a maximum integral adjust value, the step of determining if the magnitude is within the first range including:

subtracting the magnitude from the acceptable instability magnitude to generate an error;

mathematically combining the error with the integral to generate an integral adjust value; and where the integral adjust value is negative or zero, indicating that the magnitude is within the first range;

where the integral adjust value is positive, setting the integral adjust value equal to zero; and where the step of reducing the modulating waveforms includes the steps of:

determining if the integral adjust value magnitude is greater than the maximum integral adjust value;

where the integral adjust value magnitude is greater than the maximum integral adjust value, setting the integral adjust value equal to the maximum integral adjust value;

setting the integral equal to the integral adjust value;

adding the integral to the deadtime compensation magnitude to generate a deadtime correction magnitude;

multiplying the deadtime correction value by the sign of each phase current to generate a separate deadtime correction signal for each modulating waveform; and adding the deadtime correction signals to corresponding modulating waveforms.

6. The method of claim 5 wherein the maximum integral adjust value is negative twice the deadtime compensation signal magnitude.

7. The method of claim 1 wherein the step of identifying the duration of a first half cycle and the step of identifying the duration of a second half cycle include the step of using a single current sensor to identify first, second and third consecutive current zero crossing instances, subtracting the first from the second zero crossing instances to determine the first half cycle duration and subtracting the second from the third zero crossing instances to determine the second half cycle.

8. An apparatus for use with a three phase AC induction motor and a motor controller including an open loop inverter and at least one sensor which identifies zero crossings in a single motor phase current, the controller providing a first range and a separate modulation signal for each of the three motor phases, the apparatus for stabilizing motor operation during no load conditions, the apparatus comprising:

an identifier for identifying the duration of a first half cycle of the phase current as a first duration and identifying the duration of a second half cycle of the phase current which consecutively follows the first half cycle as a second duration;

a first summer for mathematically combining the first and second durations to generate a cycle error having a difference magnitude, the cycle error being the difference between the first and second durations;

a determiner for determining if the difference magnitude is within the first range; and a compensator which cooperates with the determiner for, where the difference magnitude is within the first range, reducing the modulating waveforms during a third half cycle which consecutively follows the second half cycle.

9. The apparatus of claim 8 also including wherein the controller also provides three initial deadtime compensation signals, one deadtime compensation signal corresponding to each of the three modulating signals and the compensator reduces by modifying the magnitudes of the deadtime compensation signals as a function of the difference magnitude thereby generating three deadtime correction signals and adding the deadtime correction signals to associated modulating signals.

10. The apparatus of claim 9 compensator modifies by reducing the deadtime compensation signal magnitude to generate the deadtime correction signals.

11. The apparatus of claim 10 wherein the controller also initially provides an integral and the determiner thereafter provides the integral, the integral corresponding to the amount by which the deadtime compensation signal magnitude has most recently been modified and, wherein the controller also provides an acceptable instability value indicating a magnitude which corresponds to an acceptable degree of instability and a maximum integral adjust value and, wherein, the determiner determines if the difference magnitude is within the first range by:

subtracting the magnitude from the acceptable instability magnitude to generate an error;

mathematically combining the error with the integral to generate an integral adjust value; and where the integral adjust value is negative or zero, indicating that the magnitude is within the first range;

where the integral adjust value is positive, setting the integral adjust value equal to zero; and wherein the compensator reduces the modulating waveforms by:

determining if the integral adjust value magnitude is greater than the maximum integral adjust value;

where the integral adjust value magnitude is greater than the maximum integral adjust value, setting the integral adjust value equal to the maximum integral adjust value;

setting the integral equal to the integral adjust value;

adding the integral to the deadtime compensation magnitude to generate a deadtime correction magnitude;

multiplying the deadtime correction value by the sign of each phase current to generate a separate deadtime correction signal for each modulating waveform; and adding the deadtime correction signals to corresponding modulating waveforms.

12. The apparatus of claim 11 wherein the maximum integral adjust value is negative twice the deadtime compensation signal magnitude.

* * * * *